United States Patent [19]

Koroljuk et al.

[11] 4,004,191
[45] Jan. 18, 1977

[54] METHOD OF REDUCING CURRENT UNBALANCE IN A THREE-PHASE POWER TRANSMISSION LINE OPERATING WITH ONE FAULTY PHASE

[76] Inventors: Jury Fedorovich Koroljuk, ulitsa Tankovaya, 67, kv. 77; Lidia Petrovna Scherbakova, ulitsa Uchitelskaya, 32, kv. 3, both of, Novosibirsk; Jury Andreevich Vakulenko, ulitsa Chernyshevskogo, 132a, kv. 55, Saratov; Vladimir Nikolaevich Matrosov, ulitsa Pasadskogo, 276, kv. 3, Saratov; Viktor Demyanovich Rud, ulitsa 20 let VLKSM, 103, kv. 2, Saratov; Timofei Vasilievich Chelyshev, ulitsa Pasadskogo, 272/274, kv. 33, Saratov; Vyacheslav Viktorovich Shabashov, ulitsa Pasadskogo, 215, kv. 209, Saratov; Vladislav Vasilievich Shubnikov, ulitsa Pasadskogo, 215, kv. 167, Saratov; Vadim Lvovich Schedrikov, ulitsa Rabochaya, 10, kv. 25, Saratov, all of U.S.S.R.

[22] Filed: May 2, 1975

[21] Appl. No.: 573,996

[52] U.S. Cl. .............................. 317/9 PF; 317/20; 307/103; 317/47
[51] Int. Cl.² ......................................... H02H 7/22
[58] Field of Search ............... 317/9 PF, 10, 20, 30, 317/43, 47, 49; 307/3, 20, 24, 31, 33, 51, 102, 103, 85–87; 321/9

[56] References Cited

UNITED STATES PATENTS

| | | | |
|---|---|---|---|
| 1,363,707 | 12/1920 | Beard | 307/3 |
| 2,181,321 | 11/1939 | Friedlander | 307/103 X |
| 2,185,707 | 1/1940 | McLachlan et al. | 307/103 |
| 3,211,914 | 10/1965 | Anderson | 307/3 |
| 3,237,031 | 2/1966 | Yeates et al. | 317/47 X |
| 3,739,188 | 6/1973 | Froehling | 307/103 |

*Primary Examiner*—J D Miller
*Assistant Examiner*—Patrick R. Salce

[57] ABSTRACT

A method for reducing current unbalance in the electric system of a three-phase A.C. power transmission line operating in an incomplete phase regime using the wires of the line and transformers electrically coupled thereto. A disconnected wire of the line operating in the incomplete phase regime is grounded at one end thereof and a suitable alternating voltage source is connected at the other end thereof to increase the current flowing through the transformer neutrals, thus reducing current unbalance in the electric system. An embodiment of the invention provides for the use of a lightning protection wire rope instead of the wire in case the latter is broken.

5 Claims, 10 Drawing Figures

METHOD OF REDUCING CURRENT UNBALANCE IN A THREE-PHASE POWER TRANSMISSION LINE OPERATING WITH ONE FAULTY PHASE

The present invention relates to the art of electric power transmission and more precisely to a method of reducing current unbalance in a three-phase power transmission line operating with one faulty phase; the method can be advantageously used with one faulty phase; the method can be advantageously used in 110–500 kV A.C. power transmission lines.

Damage to the insulation of overhead power transmission lines caused by short circuits is quite common at the present time. Most short circuits are caused by atmospheric phenomena, such as thunderstorms, strong winds, snowfall, and the like.

The time required to repair the damage caused to the insulation is determined by the time required for the repair proper, the time for bringing the repair crew to the site of damage, as well as the time for detecting the location of the fault, the greatest part of the time being consumed by the process of detecting the point of fault and the process of bringing the repair crew and the equipment needed to the site of the fault.

It should also be noted that very often weather conditions present additional hazards preventing these operations from being performed in a shortest possible time with the result that repairs take from a few hours to a few days.

If the consumer was supplied by the damaged line only, he will be deenergized for the duration of repairs. In case the additionally available power sources are not sufficient to provide power to all the region involved, partial restrictions are imposed on the consumers until the fault is eliminated.

Any restriction of power consumers results in losses which are incurred to the industrial enterprises in the region affected for the duration of said restriction.

It is therefore common practice at present, in case of a sustained one-phase short circuit in the line to continue operating it with two conductors only while carrying out necessary repairs. The process of operating with two conductors is often termed in the literature as a two-phase operating mode or an incomplete phase regime of the line.

The term "incomplete phase regime" will be used hereinbelow in the sense of operating a line with two conductors only.

The incomplete phase regime, however, is fraught with the following disadvantage.

The power transmitted through the line is limited by the current unbalance appearing in the stator windings of current generators, synchronous condensers, synchronous and asynchronous motors, as well as by the unbalance of illumination and household loads. The term "current unbalance" for example in an electric machine serves to designate the ratio of negative sequence current to the positive sequence current in the machine.

The valve of current unbalance is subject to specification and is determined in turn by the design features of electric machines and apparatuses and their operation conditions.

In order to reduce the value of current unbalance when operating under the conditions of incomplete phase regime, use is often made of a prior art method wherein the disconnected damaged line is grounded from both ends thereof.

The above method can be used provided the short circuit is not accompanied by a line break and the wire insulation relative to ground can sustain the voltage induced by the two remaining conductors which carry current.

As a rule a short circuit in the lines rated at 220 kV and higher is not accompanied by a break of wire and after the short circuit is deenergized the wire insulation relative to earth is capable of sustaining a voltage which is 25 to 50 percent of the rated voltage.

The above method for reducing current unbalance permits increasing the power transmitted over the line which operates under the conditions of incomplete phase regime by 6 to 8% as compared with the conventional incomplete phase regime operation of the line.

However, the present method of reducing current unbalance permits only a negligible increase of transmitted power. Moreover, as stated earlier, the method requires preconditions, such as absence of a broken wire, while the insulation at the point of the fault must not be damaged by the voltage induced by the current in the sound wires.

These requirements tend to cause problems when using the method for 110 kV lines, which lines are generally made with conductors of a rather small cross-section, which often break as a result of a short circuit.

An object of the present invention is to provide a 1.4- to 1.6-fold increase of power transmitted over a line operating in the incomplete phase regime as compared with the conventional incomplete phase regime of the power line, the current unbalance thereof being equal.

Another object of the present invention is to reduce current unbalance in case the faulty wire in the line is broken or its insulation relative to ground is not capable of sustaining the voltage appearing in it when the wire is grounded from both ends thereof.

These objects are achieved in a method for reducing current unbalance in a three-phase alternating current power transmission line operating in an imcomplete phase regime, wherein use is made of the wires of this line and transformers electrically coupled thereto, comprising the following steps: providing an electrically closed loop made up of the line operating in an incomplete phase regime, a wire which is insulated relative to ground and disposed in a parallel manner along the whole length of said line, and neutral wires of said transformers; connecting said electrically closed loop to a source of alternating voltage which is operating in phase with the electrical system into which system said line is connected; selecting a required phase and value of voltage of said source to provide a required increase of current flowing through the neutral wires of said transformers.

Current unbalance in an electrical system can be reduced as a result of increasing the currents flowing through the neutral wires of transformers which are electrically connected to the line operating in the incomplete phase regime.

Since the power transmitted over a line operating in the incomplete phase regime is restricted by the value of current unbalance, the method according to the present invention permits said power to be increased 1.4 to 1.6 times as compared to conventional incomplete phase regimes, the value of current unbalance being equal.

The disconnected wire of said line, grounded at one end is advantageously used as the wire that is insulated relative to ground and disposed along the entire length of the line operating in the incomplete phase regime, whereas said alternating voltage source is conveniently provided by a transformer arranged at the opposite end of said disconnected wire, one winding of said transformer being connected between the disconnected wire and ground and the second winding being connected to the phase or line voltage of the electric system to which said line is connected.

The disconnected wire can be used also when the short circuit did not result in a broken wire and the insulation at the point of fault can sustain the voltage induced by the current in the live wires of the line. As a rule, this is the case with lines rated at 220 kV and higher. Therefore, a disconnected wire is recommended for use in case of lines rated at 220 kV and higher which operate in the incomplete phase regime.

The method according to the present invention can be advantageously used by the provision of a single-phase or three-phase transformer at one end of the line, or a single-phase or three-phase autotransformer.

In view of the fact that the transformer or autotransformer is used as a source of e.m.f. and it is basically immaterial whether the function is performed by a transformer or an autotransformer, the term "transformer" will be used throughout hereinbelow. It is, however, understood that an autotransformer can be used as a source of e.m.f. for the purpose.

The idea of using a transformer as a voltage source can always be easily reduced to practice since a line usually connects two sub-stations where stand-by transformers are generally available, or there is always a possibility to unload one of the transformers of the sub-station.

On the other hand there is no difficulty in providing a special transformer at one of the sub-stations, which can also be used for normal operation of the electric system when it is used in parallel to increase the reliability of the electric system as a whole.

Voltage across one winding of said transformer must be within 15 to 35% of the rated voltae of the line, whereas the voltage of the second winding must correspond to one of the rated voltages of the sub-station where it is installed. In case the transformer is of a multi-winding type, the voltage of at least one of the windings thereof must correspond to one of the rated voltages of the sub-station where it is installed.

The present invention also envisages groundings at the ends of the three-phase line. At present all 110–500 kV lines are provided with such grounding at the beginning and the end of the line.

The function of a wire which is insulated relative to ground and disposed along the entire length of the line operating in the incomplete phase regime can be advantageously performed by the lightning protection wire rope which is insulated relative to ground along its entire length and grounded at one of its ends, while the function of said alternating voltage source can be performed by a transformer located at the opposite end of said wire rope, one of the transformer windings being connected between ground and the wire rope, whereas the second winding is connected to the phase or line voltage of the electric system to which said power transmission line is connected.

Short circuits occurring on 110 kV lines often result in wire breaks, and therefore a disconnected wire of the line can be used for the purpose only after checking it for breakage. Otherwise the purpose is advantageously achieved by using the lightning protection wire rope of the power transmission line.

Since the present method involves application of voltage to the wire rope, the insulation thereof must naturally withstand the voltage impressed. A lightning protection wire rope is easily insulated against 10 – 25 kV current. It is common practice at present to insulate the wire rope relative to ground, the wire rope being grounded at one point only; at other points the wire rope is connected to the ground via spark gaps. A wire rope which is insulated relative to ground achieves a number of objects, such as the melting of ice on the rope; it can also be used for the purpose of establishing communication, etc.

Since the wire rope used in the method according to the present invention will carry current whose magnitude determines the effect of current unbalance reduction in the electric system, the wire rope is preferably made of aluminum. This can be easily provided on newly erected power transmission lines.

The electric closed loop is preferably made by directly connecting one of the ends of a disconnected wire of the line operating in the incomplete phase regime to the neutral wire of at least one of the transformers which have electrical connection to said line, the neutral wire of said transformer being disconnected from ground, and another transformer is used as a source of said alternating voltage, the other transformer being located on the other end of said disconnected wire and having one of its windings connected between the disconnected wire and ground, while the other winding is connected to the phase or line voltage of the electric system to which said power transmission line is connected.

The neutral wire of most transformers is generally rated at a certain voltage, depending on the rated voltage of the transformer. This makes it possible to disconnect the neutral wire from ground in order to reduce in the electric system short circuit currents to ground. Insulated transformer neutrals permits the voltage to be regulated also be means of booster transformers.

Insulated transformer neutrals offer a possibility of using the present method provided the disconnected wire of the line is connected directly to the neutral wire of transformer windings having electrical connection to the line which operates in the incomplete phase regime.

The only limitation placed upon the method of connecting transformer neutrals to the disconnected wire resides in the fact that the value of voltage must not exceed the level of insulation of the neutral. A spark gap must be connected to prevent voltage build-up during transient processes between the neutral and ground.

In addition, said electric loop is preferably made by directly connecting one of the ends of said lightning protection wire rope which is electrically insulated relative to ground along the entire length thereof, to the neutral wire of at least one of the transformers having electrical connection to said line, the neutral wire of said transformer being disconnected from ground, while said source of alternting voltage is provided by a transformer located at the opposite end of said lightning protection wire rope, one of the windings of said transformer being connected between said wire rope and ground, and the other winding being connected to the phase or line voltage of the electric system to which said line is connected.

Thus the method according to the present invention can be widely used on 110–500 kV lines operating in the incomplete phase regime, thereby increasing the power transmitted over these lines when operating in the above mode.

Taking into consideration the fact that single-phase short circuits are a common occurrence in these lines (from 0.3 to 0.7 times per 100 km per year), it will be appreciated that the economic effect of the proposed method will be quite substantial.

Other objects and advantages of the proposed method will become apparent from the following detailed description thereof taken in conjunction with the accompanying drawings, wherein.

Figure 1:
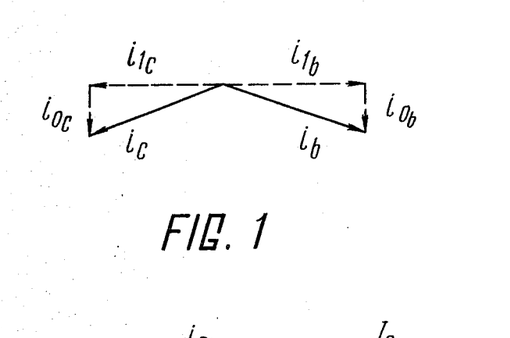
FIG. 1 illustrates a current vector diagram of a three-phase line operating in an incomplete phase regime (with phase A wire deenergized)

Referring now to the drawings, FIG. 1 illustrates a current vector diagram in the wires of a three-phase line operating in the incomplete phase regime. Since any one of the three wires can be damaged and thus deenergized and the phenomena occurring in the line will be the same irrespective of which of the wires is deenergized, the processes occurring in the line operating in the incomplete phase regime will be explained hereinunder for the case when phase A is deenergized.

The symbol $i_b$ in FIG. 1 indicates the current in phase B of the line, whereas symbol $i_c$ indicates the current in phase C of the line.

A system of two currents can be represented as a sum of currents of two systems of symmetric components. Let us define one system as zero sequence currents and the other as first sequence currents. The zero sequence currents are equal to half the sum of the phase B and C currents each. For phase B the first sequence currents are equal to half the difference between the phase B and C currents, whereas for phase C they are equal to half the difference between phase C and B currents.

The zero sequence currents are denoted by symbols $i_{ob}$ for phase B and $i_{oc}$ for phase C, whereas the first sequence currents will be denoted by symbols $i_{ib}$ and $i_{ic}$ respectively.

Since the transformer windings (FIG. 2) are connected in series with the line, they carry currents $i_{ob}$, $i_{oc}$, and $i_{ic}$, which currents are transformed by the transformer. The currents in the second winding of the transformer are denoted as $I_{ob}$, $I_{oc}$, $I_{ib}$, $I_{ic}$.

Figure 2:
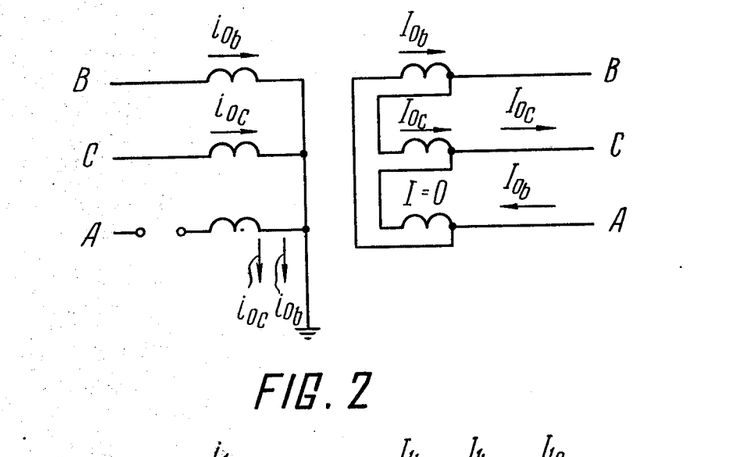
FIG. 2 shows a transformation diagram of zero sequence currents through a three-phase transformer with a unity transformation ratio.
Figure 3:
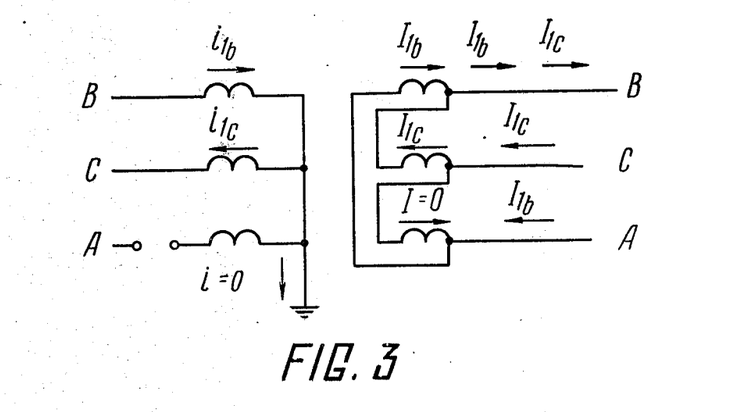
FIG. 3 is the same as FIG. 2 for first sequence currents.

The zero sequence currents as well as the first sequence currents are transformed through a star-delta-connected transformer in a different way.

FIGS. 2 and 3 illustrate the transformation of zero and first sequence currents through a transformer with a unity transformation ratio, and connected to star with an grounded neutral and delta.

When phase A (FIG. 2) is disconnected from the line coupled to the star-connected windings of the transformer, the resistance of delta-connected widing of the transformer, between phases A and C is very high, therefore all the current $I_{ob}$ which this winding carries will flow in the reverse direction in phase A of the load, whereas the current $I_{oc}$ in phase C flows without changing its direction in phase C of the load.

The first sequence currents are transformed in a different manner. Referring to FIG. 3, consider that since for the first sequence currents, as well as for the zero sequence currents, the resistance of phase A winding connected to the delta circuit of the transformer is higher by two orders than the resistance of the other delta windings, the current in phase A winding is practically zero. Therefore the first sequence current in phase B, $I_{ib}$ flows in the reverse direction in the phase A load. The C phase current, $I_{ic}$, flows without changing its direction in the phase C load, whereas the B phase current of the load is equal to the sum of phase B current, $I_{ib}$ and phase C current, $I_{ic}$, taken with a reverse sign, that is the phase B current, $I_{ib}$ of the load is equal to double current B, $i_{ib}$ of the line.

The sum of first and zero sequence currents of the load are true currents flowing in the load phases. They are illustrated in FIG. 4.

Symbol $I_a$ denotes phase A current of the load, symbol $I_c$ is phase C current of the load.

Current $I_b$ of phase B is equals to double the first sequence current. Current $I_c$ of phase C is equal to the current $i_c$ of phase C. Current $I_a$ of phase A is equal to the value of current $i_b$ and is opposite to it.

Figure 4:
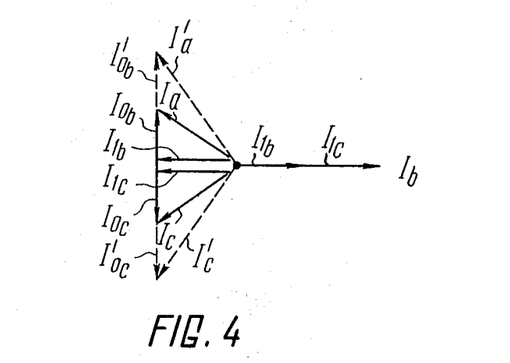
FIG. 4 illustrates the vector diagram of phase currents on the transformer side, the transformer windings being delta-connected.

As seen from FIG. 4, current unbalance can be reduced by increasing current $I_{ob}$ to $I'_{ob}$ and current $I_{oc}$ to current $I'_{oc}$, without changing the first sequence currents. The line currents $I_{ob}$ and $I_{oc}$ are equal to currents $i_{ob}$ and $i_{oc}$, respectively.

In other words, if we increase the zero sequence currents $i_{ob}$ and $i_{oc}$ in the line, without changing the first sequence currents $i_{ib}$ and $i_{ic}$, the current unbalance will be decreased. Current unbalance is known to decrease until the angle of currents $i_{ib}$ and $i_{ic}$ in the line operating in the incomplete phase regime, reaches 60°. Further, the unbalance tends to increase with the angle decreasing.

Thus in summary it may be said that in operating a line in the incomplete phase regime we can reduce current unbalance by increasing the zero sequence currents $i_{ob}$ and $i_{oc}$ in the line phases.

Figure 5:
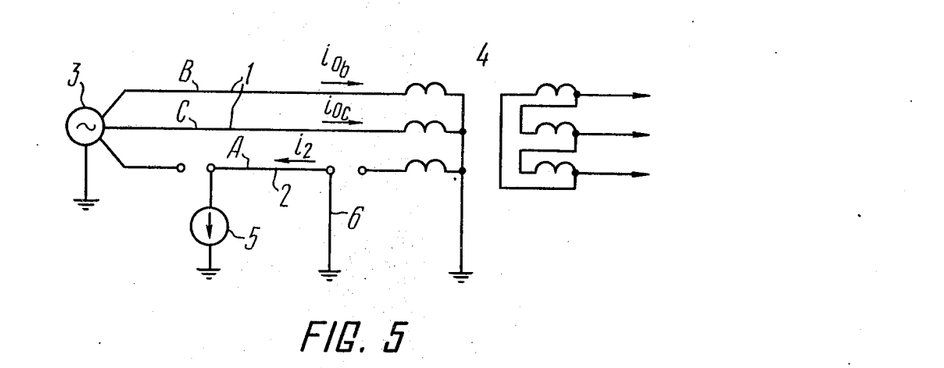
FIG. 5 shows a schematic diagram of a three-phase line operating in the incomplete phase regime, wherein one of the ends of the deenergized wire is ground, according to the invention.
Figure 6:
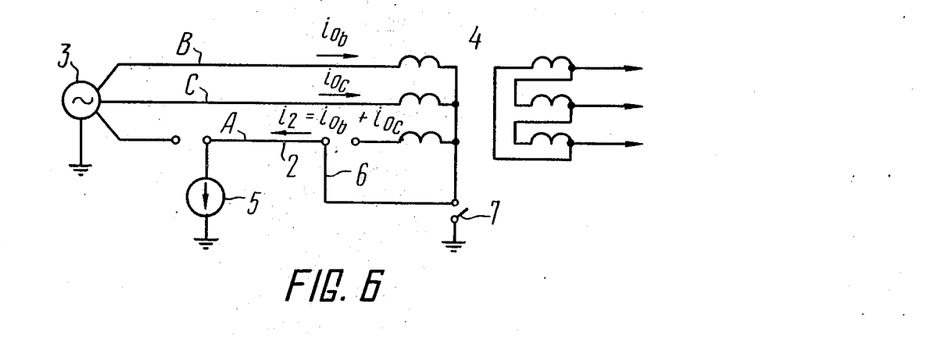
FIG. 6 is the same as FIG. 5, when the deenergized wire is connected to the neutral of the transformer windings electrically connected to the line operating in the incomplete phase regime, according to the invention.

FIGS. 5 and 6 schematically represent power transmission lines operating in the incomplete phase regime using the method according to the present invention.

In these Figures, 1 indicates a three-phase line operating in the incomplete phase regime, with a deenergized wire 2 of phase A. The line 1 is supplied by a generator system 3, with a transformer 4 connected to the opposite end of the line.

A voltage source 5 is connected to the deenergized wire 2 from the side of the generator system 3, said voltage source being synchronously coupled with the generator system 3. The wire 2 is grounded from the other end thereof with ground 6.

In FIG. 6 the neutral of transformer 4 is disconnected from ground by means of a disconnector 7, whereas the wire 2 is connected to the neutral of transformer 4.

As seen from FIG. 5, the voltage source 5 connected to the deenergized wire 2 of line 1 operating in the incomplete phase regime, offers an additional electrical closed loop for the zero sequence currents $i_{ob}$ and $i_{oc}$ to flow in the line 1.

Current $i_2$ in the wire 2, impressed by the voltage source 5 will partially flow through the neutral of transformer 4, the line 1 and the neutral of the generator system 3.

In this case it is necessary for the direction of voltage from the said source to be such that the zero sequence currents in the energized wires of line 1, determined by the voltage source 5, have the same direction as the zero sequence currents $i_{ob}$ and $i_{oc}$ in this line when operating in the conventional incomplete phase regime.

Such connection of the voltage source 5 enables us to increase the zero sequence currents in the line 1, since the zero sequence currents, determined by the generator system 3 and the voltage source 5 are summed up with one and the same direction. Accordingly, an increase of zero sequence currents in the line 1 results in reduced current unbalance in the generating system 3 and in the load phases.

Zero sequence currents in the line can be increased by connecting the deenergized wire 2 (FIG. 6) to the neutral of transformer 4, which is disconnected from earth by means of the disconnector 7, and connecting voltage source 5 to the other end of the wire 2.

Here all the zero sequence current flows along the path made up by the generator system 3, the wire of the incomplete phase regime line 1, the transformer 4 winding, the wire 2, the voltage source 5 and ground. In this case the current in the deenergized wire 2 will be equal to the sum of zero sequence currents $i_{ob}$ and $i_{oc}$ in the line 1.

Such connection of the deenergized wire 2 to the neutral of the transformer 4 disconnected from ground is feasible, provided the insulation of the transformer neutral is rated at a voltage which is bound to appear in it after the voltage source 5 is connected to the deenergized wire 2.

Considered next will be some embodiments of the present invention. Referring to the circuit illustrated in FIG. 7 showing a 220 kV line operating in the incomplete phase regime with a deenergized wire 2, one end of the line 1 is connected to buses 8 (220 kV) of the transmission sub-station, the other end thereof being connected to buses 9 (220 kV) of the receiving sub-station.

Figure 7:
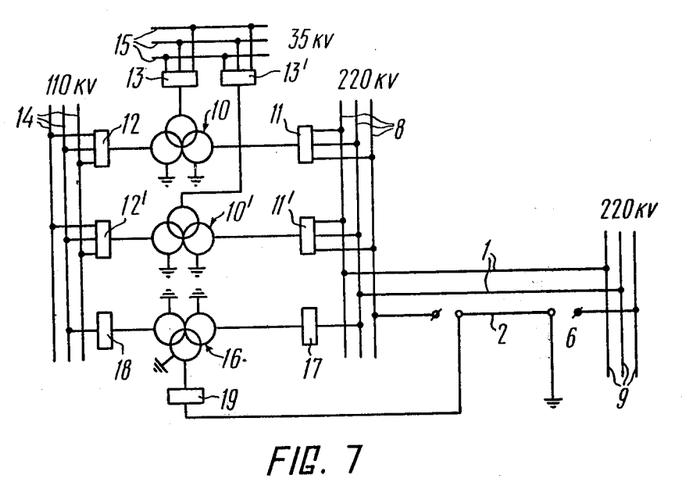
FIG. 7 illustrates a schematic diagram of a three-phase line operating in the incomplete phase regime and a transmission sub-station, for the case when a single-phase transformer is used as said voltage source and a deenergized wire of the line, grounded at the receiving sub-station is used as said wire.

It is understood that in addition to said line, other lines not shown in FIG. 7 can be easily connected to the buses 8,9 (220 kV) of both sub-stations as well.

The transmitting sub-station houses two three-winding three-phase transformers 10 and 10' with windings rated at 220, 110 and 35 kV, which windings are connected via three-phase circuit breakers 11, 12, 13, and 11', 12' and 13' respectively, the buses 8 (220 kV) buses 14 (110 kV) and buses 15 (35 kV).

In order to simplify the drawing, the three-phase connections of transformers 10 and 10' with circuit breakers 11, 12, 13 and 11', 12', 13' respectively, are shown as single lines. A single-phase three-winding transformer 16 is also provided at the transmitting sub-station to be used as a stand-by transformer to back up any phase of the three-phase transformers 10 or 10' for repairs. The single-phase transformer 16 can be connected via single-phase switches 17 or 18 to any bus system 8 or 14, respectively.

In case of a fault in the wire 2 of the line 1, which did not result in its breakage, while the insulation at the point of fault is able to sustain a voltage of 35 kV, the present invention can be embodied as follows.

The deenergized wire 2 is grounded at the receiving sub-station 9 with the grounded 6. At the transmitting sub-station, one of the lead-outs of the 35 kV winding of the single-phase transformer 16 is grounded, whereas the other leadout of said winding is connected via a circuit breaker 19 to the disconnected wire 2. The single-phase transformer 16 is connected to the respective phase of bus 8 (220 kV) or 14 (110 kV), and voltage is fed to the disconnected wire 2 by means of the switch 17 or 18, respectively.

If for some reason a single-phase transformer cannot be used while the power supplied by one of the three-phase transformers 10 or 10' is sufficient to supply the consumers connected to the buses 15 (35 KV), one of the transformers 10 or 10' must be disconnected from the buses 15 (35 kV) in order to supply voltage to the disconnected wire. In order to supply volage to the disconnected wire 2, after the transformer 10 or 10' is disconnected from the buses 14 (35 kV) one of its kV winding leadouts must be grounded and the other leadout of the winding (35 kV) must be connected to the disconnected wire 2 of the line 1.

Figure 8:
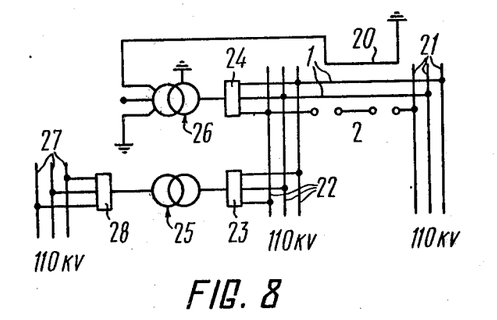
FIG. 8 is the same as FIG. 7, for the case when a lightning protection wire rope is used as said wire and a stand-by three-phase transformer is used as said voltage source.

Consider the diagram illustrated in FIG. 8. As a result of a short circuit in the wire 2, the power transmission line 1 is operated in the incomplete phase regime mode. The failure resulted in a broken wire 2. A lightning protection wire rope 20 is provided on the line 1, being grounded at the receiving sub-station 21, its insulation along the entire length thereof being capable of sustaining 10 kV voltage.

The power transmission line 1 connects buses 21 (110 kV) of the receiving sub-station and buses 22 (110 kV) of the transmitting sub-station. Connected to the buses 22 (110 kV) via circuit breakers 23 and 24 two three-phase two-winding transformers 25 and 26 respectively, the rated voltage of their windings being 110 kV and 10 kV, one of the transformers being used for supplying power consumers connected across buses 27 (10 kV). Generally, taking into consideration the value of permissible overload, the power delivered by one of the transformers 25 or 26 is sufficient to supply all consumers connected across buses 28 (10 kV). These buses are coupled to the transformer 25 via circuit breaker 28. FIG. 8 illustrates the coupling of only one transformer (25) since the other transformer (26) is disconnected from the buses 28 (10 kV), while one of the leadouts of the 10 kV winding of the latter transformer is grounded and the other leadout of the 10 kV winding is connected to the lightning protection wire rope 20.

Figure 9:
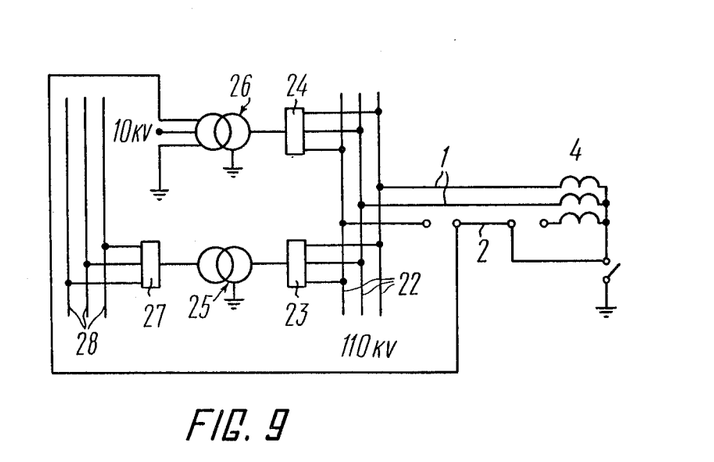
FIG. 9 illustrates a diagram for connecting a deenergized line wire to the transformer neutral.

FIG. 9 illustrates a 110 kV line 1 with a disconnected wire 2. The sub-station diagram is the same as in the preceding example. The transformer 4 is connected to the line at the receiving sub-station. FIG. 9 shows only the 110 kV winding of the transformer, which is disconnected from ground by the disconnector 7. At the transmitting sub-station the disconnected wire is connected to one of the leadouts of the 10 kV winding of the transformer 26. Other operations at the transmitting sub-station are the same as in the previous example.

In case the disconnected wire 2 is broken as a result of the fault, use can be made of the lightning protection wire rope.

Figure 10:
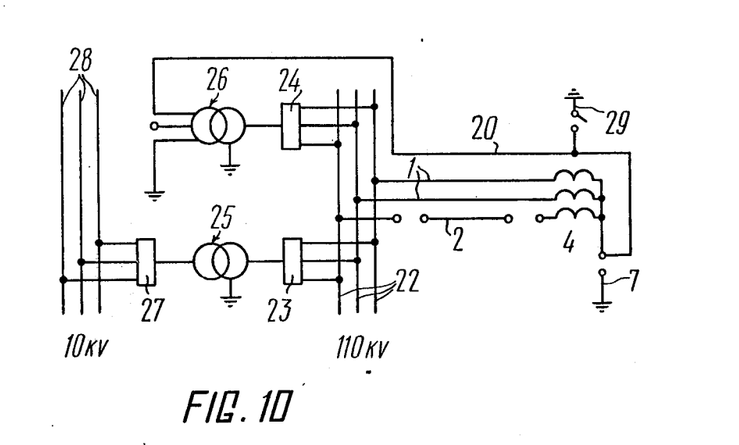
FIG. 10 illustrates a diagram for connecting a lightning protection wire rope to the transformer neutral.

Referring to FIG. 10, illustrated is the line 2 with the disconnected wire 2. The diagram of receiving and transmitting sub-stations is the same as in the previous example.

The line 1 is provided with a lightning protection wire rope 20 which is insulated relative to ground. On the receiving sub-station side the wire rope is grounded by a disconnector 29. In order to switch the line to operate in the incomplete phase regime, the disconnector 29 is switched off, the wire rope 20 is connected to the neutral of the transformer 4 and the neutral is disconnected from ground by means of the disconnector 7. At the transmitting sub-station, the wire rope 20 is connected to one of the leadouts (10 kV) of the transformer 26. Other operations at the transmitting sub-station are the same as in the previous example.

Thus, a method is proposed for reducing current unbalance when operating the electrical system of a three-phase A.C. power transmission line in an incomplete phase regime by using the wires of the line involved and transformers electrically coupled thereto, the method permitting the power transmitted over a line operating in the incomplete phase regime to be increased 1.4 to 1.6 times with only negligible expenses involved, with a simultaneous reduction of zero sequence currents.

Consider the next two examples of increasing the transmitted power in the incomplete phase regime of the line.

EXAMPLE 1

A 150 km long 220 kV line is operating in the incomplete phase regime. From the transmitting sub-station side the line is connected to a 1400 MWt power station. Operating in the receiving system are generators having a total output of 400 MWt. Owing to current unbalance in the generator windings the power transmitted over the line operating in the conventional incomplete phase regime does not exceed 62 MWt.

If the deenergized wire of the line grounded at the receiving sub-station is connected from the transmitting sub-station side to a voltage source of 35 kV, the power transmitted over the line can be increased to 108 MWt, the current unbalance in the generator windings being equal.

EXAMPLE 2

A 40 km long 110 kV line is supplying through a transformer located at a 15 MWt receiving sub-station a region which consumes 10 MWt. Current unbalance of electric receivers is limited to 20%. In the conventional incomplete phase regime the power transmitted is limited by current unbalance to 3.2 MWt.

If the disconnected wire of the line is connected to the disconnected from the ground neutral of the transformer of the receiving sub-station, while a voltage of 10 kV is impressed at the other end of said disconnected wire, the power transmitted in the incomplete phase regime of the line and with the above-mentioned current unbalance can be increased to 7.4 MWt.

What is claimed is:
1. A method for reducing current unbalance in the electric system of a three-phase A.C. power transmission line operating in an incomplete phase regime using the wires of the line and transformers electrically coupled thereto, comprising the following steps:
providing an electric closed loop circuit comprising the line operating in the incomplete phase regime, a wire insulated from ground and disposed parallel to said line along the whole length thereof, and the neutrals of said transformers;
connecting into the provided electric closed loop circuit a source of alternating voltage in phase with the electric system to which said line is connected; and
selecting the corresponding phase and value of voltage of said source to obtain an increase of current flowing through the neutrals of said transformers, resulting in decreased current unbalance in the electric system.
2. A method as claimed in claim 1, wherein the wire which is insulated relative to ground and disposed parallel to the line along the whole length thereof is a disconnected wire of said line, the method further comprising grounding the disconnected wire at one of the ends thereof, and connecting said alternating voltage source to the opposite end of said disconnected wire, connecting one of the windings of said voltage source between the disconnected wire and ground, and connecting the other winding of said voltage source to the phase or line voltage of the electric system to which said line is connected.
3. A method as claimed in claim 1, wherein the wire insulated relative to ground and disposed in parallel to the power transmission line is the line operating in the incomplete phase regime and serves as a lightning protection wire rope of said line, said method comprising grounding the rope at one of the ends thereof, connecting said alternating voltage source to the opposite end of said wire rope, connecting one of the windings of said voltage source between ground and the wire rope and connecting the other winding of said voltage source to the phase or line voltage of the electric system to which said line is connected.
4. A method as claimed in claim 1, wherein said closed loop circuit is provided by directly connecting one of the ends of the disconnected wire of the line operating in the incomplete phase regime to the neutral of at least one of the transformers electrically coupled with said line, the neutral of said transformer being disconnected from ground, the source of said alternating voltage being a transformer located at the opposite end of said disconnected wire, one of the windings of said transformer being connected between the disconnected wire and ground and the other winding being connected to the phase or line voltage of the electric system to which said line is connected.

5. A method as claimed in claim 1, wherein said closed loop circuit is obtained by directly connecting one of the ends of the lightning protection wire rope of said line, electrically insulated relative to ground along the entire length thereof, to the neutral of at least one of the transformers electrically coupled to said line, the neutral of said transformer being disconnected from ground; the source of said alternating voltage being a transformer located at the opposite end of said wire rope, one of the windings of said transformer being connected between the lightning protection wire rope and ground, while the other winding is connected to the phase or line voltage of the electric system to which said line is connected.

* * * * *